United States Patent
Asente et al.

(10) Patent No.: US 8,669,984 B2
(45) Date of Patent: Mar. 11, 2014

(54) METHODS AND APPARATUS FOR SCORE-BASED TILE PLACEMENT

(75) Inventors: Paul Asente, Redwood City, CA (US); Lesley Ann Northam, Ontario (CA)

(73) Assignee: Adobe Systems Incorporated, San Jose, CA (US)

( * ) Notice: Subject to any disclaimer, the term of this patent is extended or adjusted under 35 U.S.C. 154(b) by 635 days.

(21) Appl. No.: 12/955,085

(22) Filed: Nov. 29, 2010

(65) Prior Publication Data

US 2013/0127868 A1    May 23, 2013

Related U.S. Application Data

(60) Provisional application No. 61/371,595, filed on Aug. 6, 2010.

(51) Int. Cl.
*G06T 11/20* (2006.01)
(52) U.S. Cl.
CPC ............. *G06T 11/206* (2013.01); *G06T 11/203* (2013.01)
USPC ........... 345/440; 345/418; 345/419; 345/619; 345/440.1; 345/440.2; 345/441; 345/442; 345/443

(58) Field of Classification Search
CPC ............................ G06T 11/206; G06T 11/203
USPC .................... 345/440–442, 419, 619; 715/243
See application file for complete search history.

(56) References Cited

PUBLICATIONS

K. Dalal, et. al "A Spectral Approach to NPR Packing". Proceedings of the 4th International Symposium on Non-photorealistic Animation and Rendering, Jun. 5-7, 2006, ACM Press, pp. 71-78.*
J. Kim, F. Pellacini, "Jigsaw Image Mosaics". ACM Trans. on Graphics, 2002, vol. 21, No. 3, pp. 657-664.*
Alejo Hausner "Simulating Decorative Mosaics", 2001 from ACM Proceeding SIGGRAPH '01 Proceedings of the 28th annual conference on Computer graphics and interactive techniques. pp. 573-580.

* cited by examiner

*Primary Examiner* — Jin-Cheng Wang
(74) *Attorney, Agent, or Firm* — Wolfe-SBMC

(57) ABSTRACT

A preferred location and a preferred orientation of a tile shape are determined with respect to a current shape based on scores at multiple locations and orientations. A new shape is generated by subtracting from the current shape a tile area. The tile area includes the tile shape in the preferred orientation of the tile shape at the preferred location of the tile shape with respect to the current shape. The determining and generating are repeated with respect to the new shape.

20 Claims, 15 Drawing Sheets

METHODS AND APPARATUS FOR SCORE-BASED TILE PLACEMENT

This application claims benefit of priority to U.S. Provisional Application Ser. No. 61/371,595, which was filed on Aug. 6, 2010.

BACKGROUND

Description of the Related Art

Non-photorealistic rendering (NPR) is an area of computer graphics that focuses on enabling a wide variety of expressive styles for digital art. The field of computer graphics has traditionally exhibited a central tendency toward increasing levels photorealism, creating digital representations of an image that exhibit ever-increasing similarity to the results expected from conventional chemical photography. Non-photorealistic rendering, by contrast, seeks to generate images that simulate artistic media such as painting, drawing, technical illustration, mosaics, and animated cartoons.

Within non-photorealistic rendering, the field of generating a simulated tile mosaic from an electronic image presents a set of ongoing challenges to the image processing community. Attempts to solve the problems of a simulated tile mosaic are associated with computerized methods for filling or covering a large shape with instances of a small shape while attempting to capture or enhance the expressive quality of the image conveyed by the large shape and convey the effect created by a physical mosaic of tile and grout.

Conventional approaches to the problem of generating a simulated tile mosaic from an electronic image rely on processes that involve calculating an optimum number of possible small shape placements for within the large shape, dividing the large shape into the indicated number of placement areas, and then attempting to resolve individual placements of a small shape within each placement area of the large shape. Thus, conventional approaches to the problem of generating a simulated tile mosaic from an electronic image attempt to ascertain a general solution with respect to the number and general locations of all small shape placements before attempting a specific solution to the location of any one small shape within the large shape.

SUMMARY

Various embodiments of methods and apparatus for score-based tile placement are disclosed. A preferred location and a preferred orientation of a tile shape are determined with respect to a current shape based on scores at multiple locations and orientations. A new shape is generated by subtracting from the current shape a tile area. The tile area includes the tile shape in the preferred orientation of the tile shape at the preferred location of the tile shape with respect to the current shape. The determining and generating are repeated with respect to the new shape.

Figure 1A:
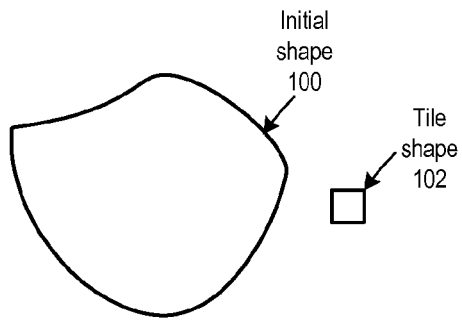
FIGS. 1A-1J illustrate results of iterative tile placement by one embodiment of a system for score-based tile placement.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for score-based tile placement are presented. Embodiments provide the ability to represent an image such as a drawing or photograph as a layout of tiles by covering the area of a large shape with instances of a small shape, thereby allowing for placement of tiles in a manner that provides aesthetically optimized coverage or fill of spaces within the image. In order to place a tile, a preferred location and a preferred orientation of a tile shape with respect to a current shape is determined. The preferred location and the preferred orientation of the tile shape with respect to the current shape are determined based on scores representing the effectiveness of the tile in conforming to an edge of the current shape at various locations and orientations. Various embodiments perform tile placement iteratively by generating a new shape in response to each tile placement. Generating the new shape includes subtracting a tile area from the current shape. The tile area includes the tile shape in the preferred orientation of the tile shape at the preferred location of the tile shape with respect to the current shape.

Example Implementation of Iterative Location Selection and Tile Area Subtraction FIGS. 1A-1J illustrate results of iterative tile placement by one embodiment of a system for score-based tile placement. FIG. 1A illustrates an initial shape 100, which embodiments of a system for iterative tile placement will cover or fill with tiles to generate a tile mosaic image. An initial shape 100 can represent an image or artwork in any format, such as vector graphics, pixels, or other graphic primitives, comprehensible to the computing machines used to perform methods for iterative tile placement. Similarly, a tile shape 102 represents the smaller shape used to cover or fill the larger shape represented by initial shape 100. While tile shape 102 is illustrated as being a square, one skilled in the art will realize in light of reading the present disclosure that any shape may be arbitrarily selected for use as tile shape 102. Similarly, a single large shape, such as initial shape 100, may be covered or filled with multiple different tile shapes in multiple sizes in some embodiments.

First Location Selection and Tile Area Subtraction

Figure 1B:
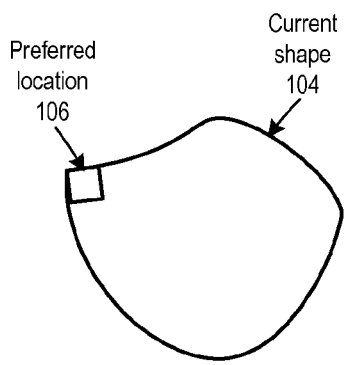

FIG. 1B depicts placement of a first tile within a shape by one embodiment of a system for score-based tile placement. Initial shape 100 from FIG. 1A is selected as current shape 104 of FIG. 1B and tile shape 102 of FIG. 1A is placed in a preferred location 106 at a preferred orientation in FIG. 1B. As will be discussed in greater detail below, selection of a preferred location and a preferred orientation can be based on a wide variety of objective, measurable criteria that will vary between embodiments. In some embodiments, criteria for determining a preferred location and a preferred orientation can be adjusted by a user, such as to create a particular aesthetic effect or to adjust system performance and rendering delay. A preferred location and a preferred orientation are determined by scoring various candidate locations and orientations with respect to the criteria used by the particular embodiment.

Figure 1C:
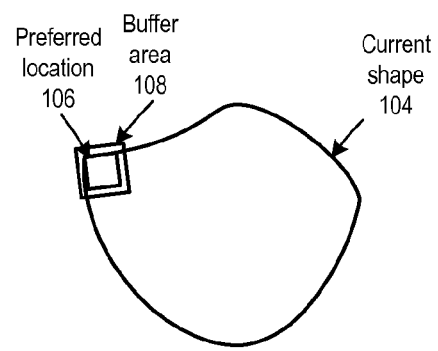

FIG. 1C illustrates a tile area subtraction within a shape by one embodiment of a system for score-based tile placement. In the illustrated embodiment, the outline of the tile shape in preferred location 106 is augmented by a buffer area 108. This augmentation allows for subtraction from current shape 104 of both an area representing tile shape 102 of FIG. 1A and buffer space, such as for a visual representation of grout. In alternative embodiments, buffer space, such as for a visual representation of grout, will be included in a tile shape, such that, rather than having a tile surface at the border of current shape 104, buffer space, such as for a visual representation of grout, will be presented at the edge of current shape 104. Preferred location 106 is stored in a data structure, such as a list, defining tile locations generated with respect to initial shape 100 of FIG. 1A.

Figure 1D:
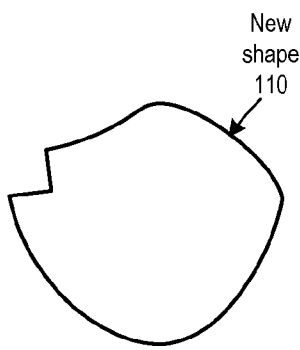

FIG. 1D depicts a result of creation of a new shape through a tile area subtraction within the previous shape by one embodiment of a system for score-based tile placement. Once the tile area subtraction depicted in FIG. 1C is performed, a new shape 110 results. New shape 110 can then be used for iterative tile placement, as discussed below.

Second Location Selection and Tile Area Subtraction

Figure 1E:
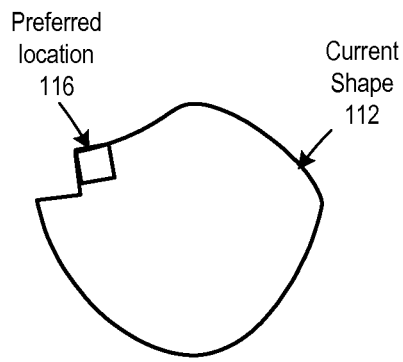

FIG. 1E depicts an iteration of tile placement (within a new shape) after creation of the new shape through a tile area subtraction within the previous shape by one embodiment of a system for score-based tile placement. New shape 110 of FIG. 1D is designated as current shape 112 of FIG. 1E and a preferred location 116 with respect to current shape 112 is chosen.

Figure 1F:
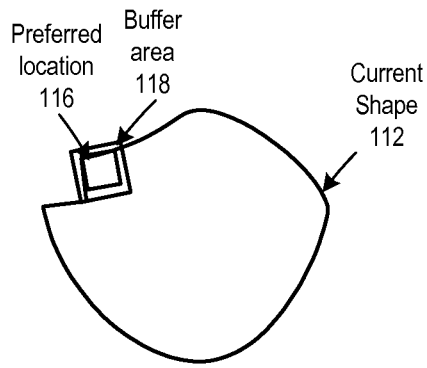

FIG. 1F illustrates a tile area subtraction within a shape by one embodiment of a system for score-based tile placement. In the illustrated embodiment, the outline of the tile shape in preferred location 116 is augmented by a buffer area 118 for subtraction from current shape 112 of both an area representing tile shape 102 of FIG. 1A and buffer space, such as for a visual representation of grout. Preferred location 116 is stored in the data structure defining tile locations generated with respect to initial shape 100 of FIG. 1A.

Figure 1G:
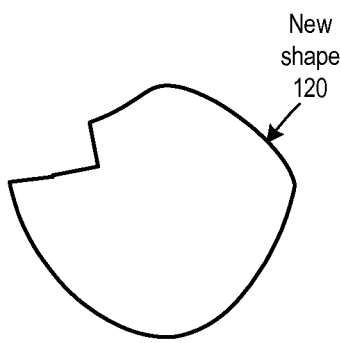

FIG. 1G depicts a result of creation of the new shape through a tile area subtraction within the previous shape by one embodiment of a system for score-based tile placement. Once the tile area subtraction depicted in FIG. 1F is performed, a new shape 120 results. New shape 120 can then be used for iterative tile placement, as discussed below.

Third Location Selection and Tile Area Subtraction

Figure 1H:
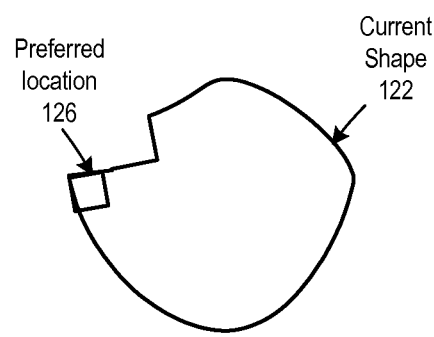

FIG. 1H depicts an iteration of tile placement (within a new shape) after creation of the new shape through a tile area subtraction within the previous shape by one embodiment of a system for score-based tile placement. New shape 120 of FIG. 1G is designated as current shape 122 of FIG. 1H and a preferred location 126 with respect to current shape 122 is chosen.

FIG. 1H illustrates one embodiment of a tile area subtraction within a shape by one embodiment of a system for score-based tile placement. In the illustrated embodiment, the outline of the tile shape in preferred location 126 is augmented by a buffer area 128 for subtraction from current shape 122 of both an area representing tile shape 102 of FIG. 1A and buffer space, such as for a visual representation of grout. Preferred location 126 is stored in the data structure defining tile locations generated with respect to initial shape 100 of FIG. 1A.

Figure 1I:
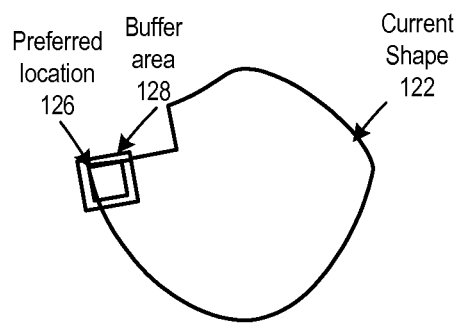
Figure 1J:
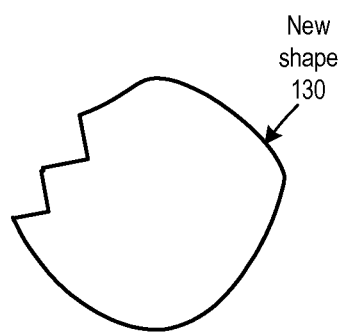

FIG. 1I depicts one embodiment of a result of creation of the new shape through a tile area subtraction within the previous shape by one embodiment of a system for score-based tile placement. Once the tile area subtraction depicted in FIG. 1H is performed, a new shape 130 results. New shape 130 can then be used for iterative tile placement, as discussed below.

The three iterations of tile placement and subtraction discussed above with respect to FIGS. 1A-1I illustrate how embodiments of methods and apparatus for score-based tile placement provide the ability to represent an image such as a drawing or photograph as a layout of tiles by covering a large shape with instances of a small shape. Complete coverage of the larger shape can be achieved by iterative repetition of the placement and subtraction steps represented above. The placement and subtraction steps are, in one embodiment, repeated until tile placement and subtraction result in a current shape of a size too small for the accommodation of an additional tile. At the end of such a process, a data structure defining tile locations has been created. The data structure contains tile locations relative to the original image and, in some embodiments, may also contain information such as tile shapes, sizes and colors.

The preferred location and the preferred orientation of the tile shape with respect to the current shape are determined based on scores representing the effectiveness of the tile in conforming to an edge of the current shape at various locations and orientations. Embodiments of operations for determining the preferred location and the preferred orientation of the tile shape with respect to the current shape based on scores representing the effectiveness of the tile in conforming to an edge of the current shape at various locations and orientations are discussed below with respect to FIGS. 2-4. Such embodiments allow for placement of tiles in a manner that provides aesthetically optimized coverage or fill of spaces within the image.

Example Embodiments of Operations for Determining the Preferred Locations

Figure 2:
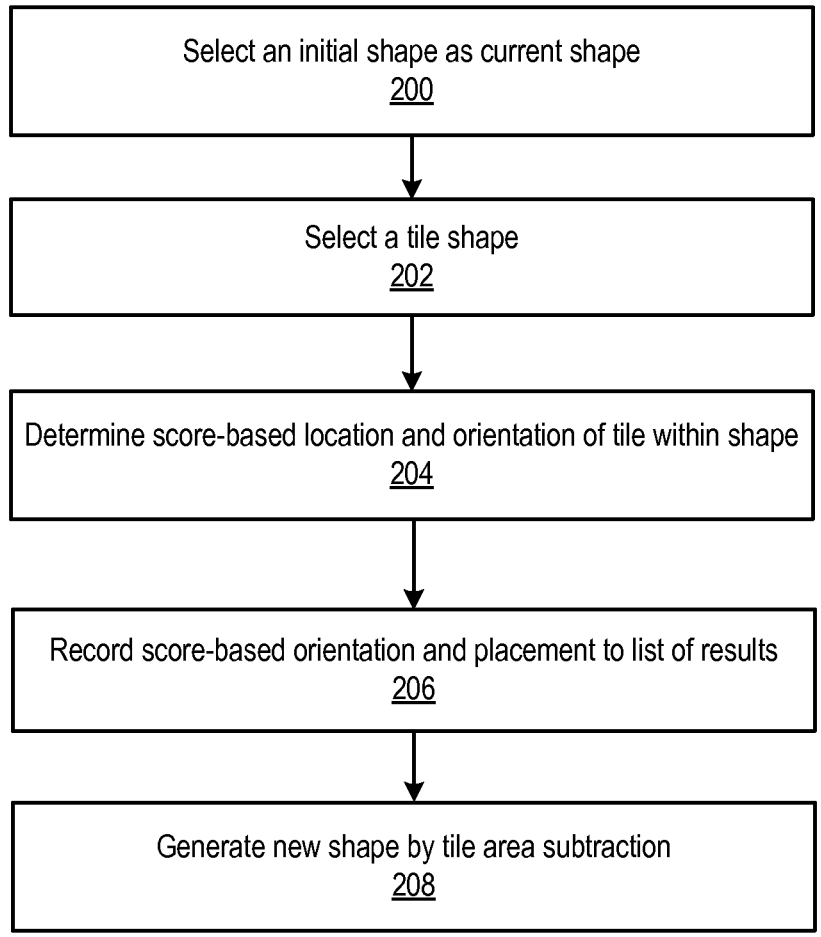
FIG. 2 is a flowchart of operations performed in locating a tile during a process of iterative tile placement by one embodiment of a system for score-based tile placement.

FIG. 2 is a flowchart of operations performed in locating a tile during a process of iterative tile placement by one embodiment of a system for score-based tile placement. An initial shape, representing the larger image to be filled with smaller shapes, is selected as the current shape (200). An example of such an initial shape is described above with respect to FIG. 1A as initial shape 100. An initial shape may be received as a file defining the shape or may be extracted by performing the decomposition of an image containing the shape. A tile shape is selected (202). In some embodiment, a tile shape may be selected by a user. In alternative embodiments, tile selection may be an automated process based on properties of the initial shape and properties of various available tile shapes. A score-based location and orientation of the tile within the current shape are determined (204). Examples of a process for scoring and score based location and orientation of a tile within the current shape are explained below with respect to FIGS. 5A-6. The score-based orientation and score based location are recorded to a list of results (206) or other output data structure. A new shape is generated by tile area subtraction (208). Area subtraction is explained above with respect to FIGS. 1C, 1F, and 1I.

Figure 3:
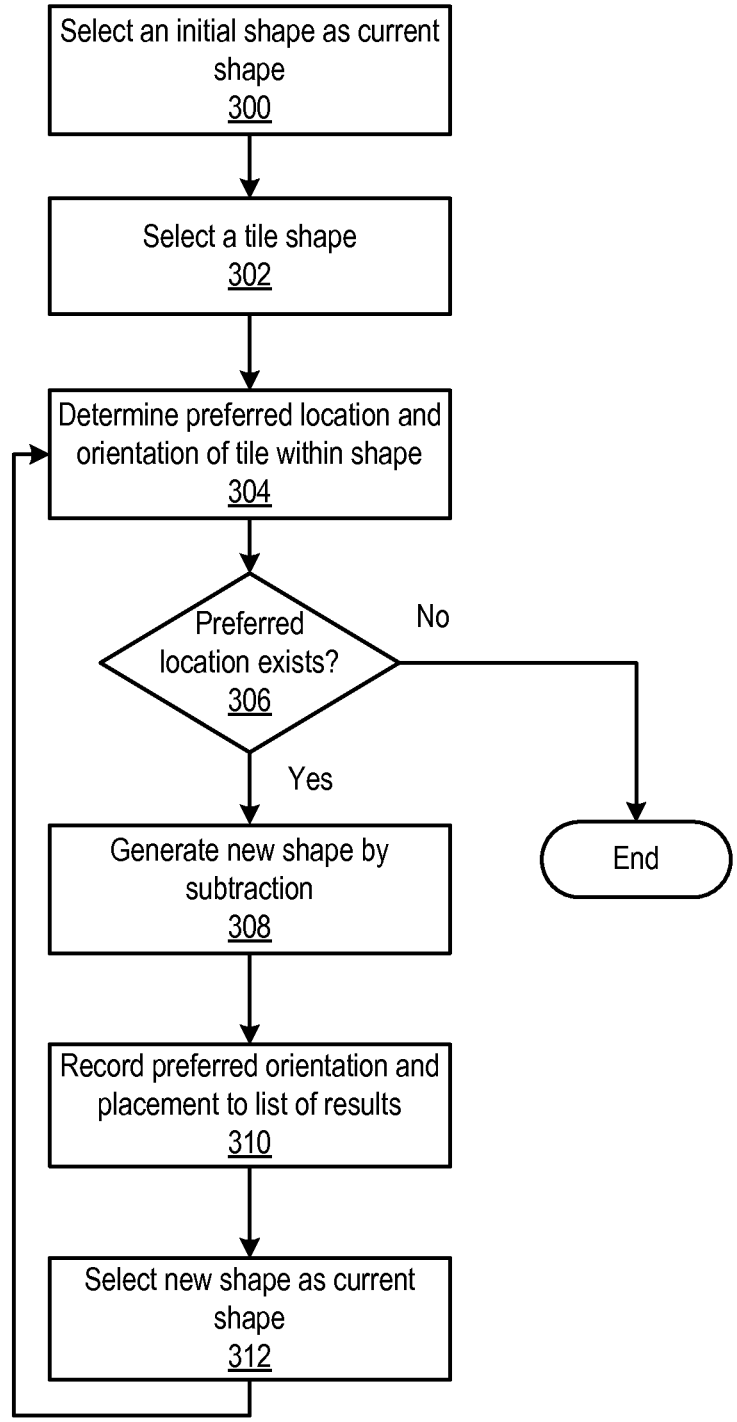
FIG. 3 is a flowchart of operations performed in locating multiple tiles during a process of iterative tile placement by one embodiment of a system for score-based tile placement.

FIG. 3 is a flowchart of operations performed in locating multiple tiles during a process of iterative tile placement by one embodiment of a system for score-based tile placement. An initial shape is selected as the current shape (300). An example of such an initial shape is described above with respect to FIG. 1A. A tile shape is selected (302). In some embodiment, a tile shape may be selected by a user. In alternative embodiments, tile selection may be an automated process based on properties of the initial shape. A preferred location and orientation, such as a score-based location and orientation, of the tile within the current shape are determined (304). Scoring is discussed below with respect to FIG. 6, and a preferred location and orientation can be selected, in one embodiment, by selecting the orientation and location achieving the highest score. Alternatively a preferred location and orientation can be selected, in one embodiment, by randomly selecting any of a set of locations and orientations with a score above a given threshold.

A determination is made as to whether a preferred location exists (306). For example, it may be determined that, using the scoring criteria employed in step 304, above, no preferred location meeting the criteria, such as a sufficiently high score as compared to a threshold, can be identified. In such a case, the process ends. At the end of the process. In alternative embodiments, scoring criteria adjustment may be undertaken and the process may continue by returning to step 304. Scoring criteria are discussed below with respect to FIGS. 5E-5H. In further alternative environments, placement of an alternative tile shape or a tile of an alternative size may be attempted and the process may continue by returning to step 302.

Returning to step 302 and the embodiment disclosed in FIG. 3, if it is determined that a preferred location does exist, then a new shape is generated by tile area subtraction (308), as discussed above with respect to FIGS. 1C, 1F, and 1I. The preferred orientation and a preferred placement are recorded to a list of results (310). The new shape is selected as the current shape (312). The process then returns to step 304, which is described above.

Figure 4:
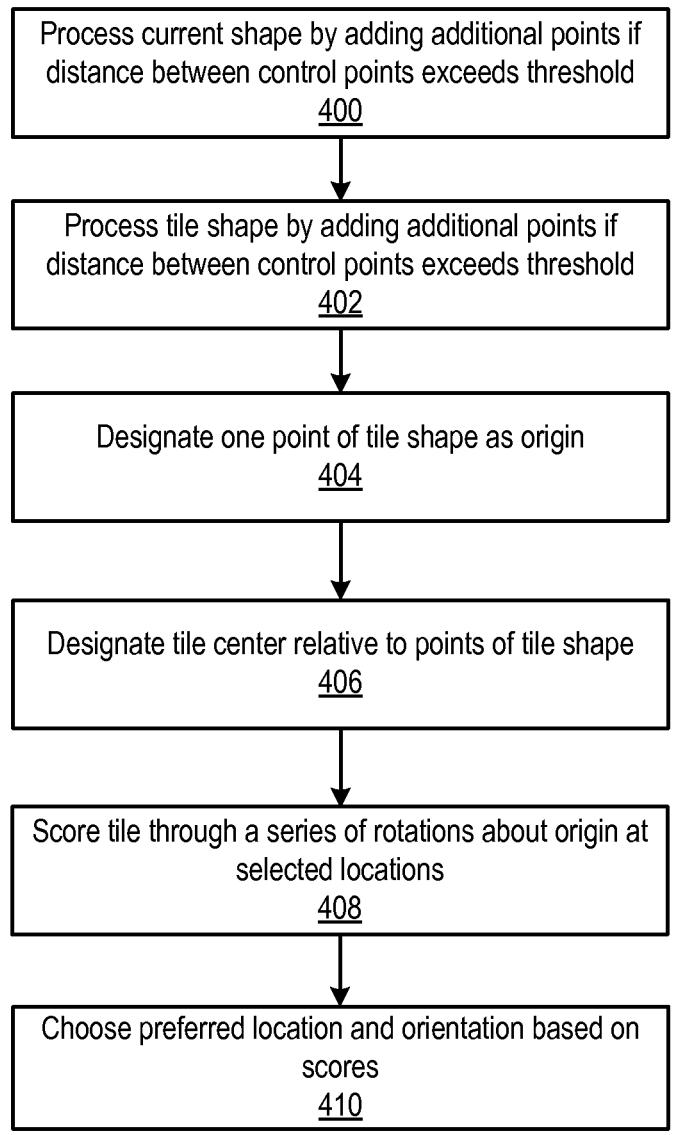
FIG. 4 is a flowchart of operations performed in determining a preferred location and a preferred orientation of an individual tile during a process of iterative tile placement by one embodiment of a system for score-based tile placement.

FIG. 4 is a flowchart of operations performed in determining a preferred location and a preferred orientation of an individual tile during a process of iterative tile placement by one embodiment of a system for score-based tile placement. A current shape is processed by adding additional points, called scoring points, to the shape if the distance between existing control points exceeds a threshold (400). In one embodiment, the threshold is a percentage of the square root of the area of the shape. Scoring points are discussed below with respect FIGS. 5B-5C. A tile shape is processed by adding additional points, called measurement points, to the tile shape if the distance between existing control points exceeds a threshold (402). In one embodiment, the threshold is a percentage of the square root of the area of the tile shape. Measurement points are discussed below with respect to FIG. 5D.

A point on an edge of the tile shape is designated as the origin (404). A center of the tile shape is designated with respect to the origin and other control points defining the tile shape (406). The tile can then be scored through a series of rotations about the origin at selected locations (408). Methods for scoring a tile through a series of rotations are discussed below with respect to FIGS. 5F-5G. The preferred location and orientation can then be chosen based on the scores (410). Criteria for choosing a preferred location are discussed below with respect to FIG. 5H.

Example Embodiments of Measurement Tools for Scoring Locations and Orientations

Figure 5A:
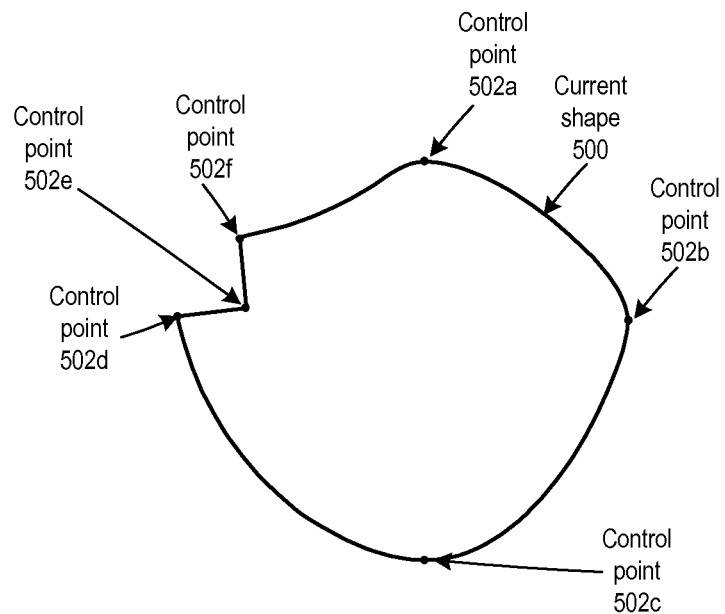
FIGS. 5A-5H illustrate results of operations performed in determining a preferred location and a preferred orientation of an individual tile during a process of iterative tile placement by one embodiment of a system for score-based tile placement.

FIGS. 5A-5H illustrate results of operations performed in determining a preferred location and a preferred orientation of an individual tile during a process of iterative tile placement by one embodiment of a system for score-based tile placement. FIG. 5A depicts a shape, such as current shape 110 of FIG. 1D. Current shape 500 is defined by a series of control points 502a-502f, which are used to generate a visual representation of current shape 500 from a mathematical representation of current shape 500. In alternative embodiments, current shape 500 may be defined in terms of an alternative shape definition scheme.

Figure 5B:
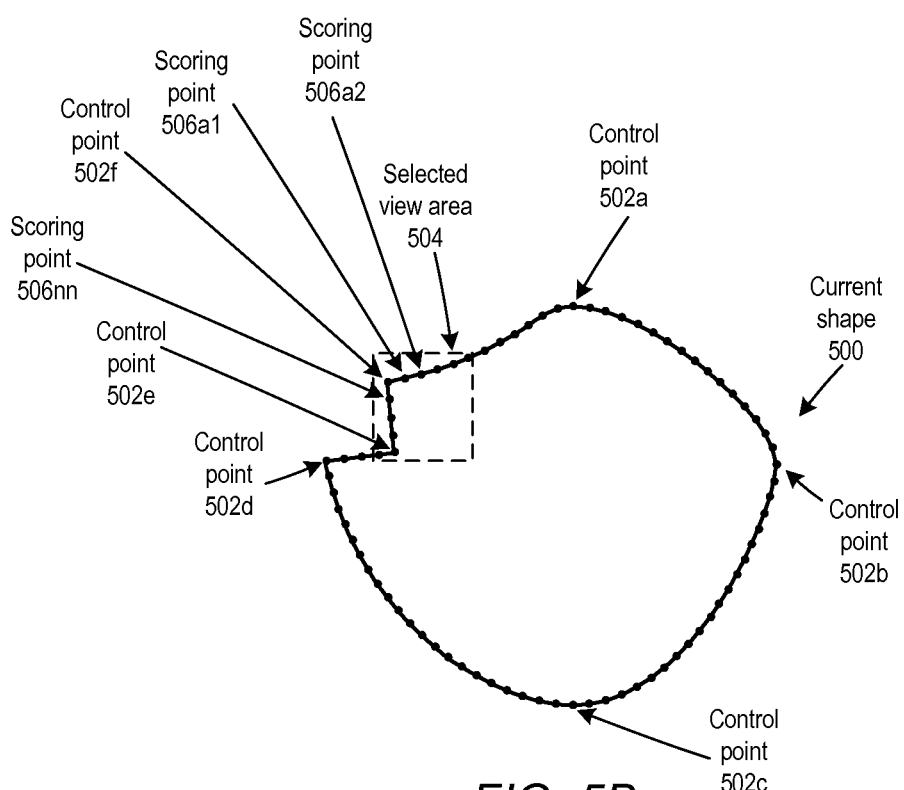

FIG. 5B illustrates a shape with added scoring points. In some embodiments, if control points 502a-502f are insufficient in number or too broadly spaced to allow for scoring of tile locations and orientations, a series of scoring points 506a1-506nn may be added along the edges of current shape 500 to provide fixed points for measurement and scoring. In one embodiment, appropriate spacing is determined with respect to the square root of the area of a shape. In alternative embodiments, feature size of the shape is used as the basis for determining appropriate spacing and determining whether scoring points are required. A selected view area 504 is also indicated in FIG. 5B. Subsequent figures representing points inside selected view area 504 will be described below.

Figure 5C:
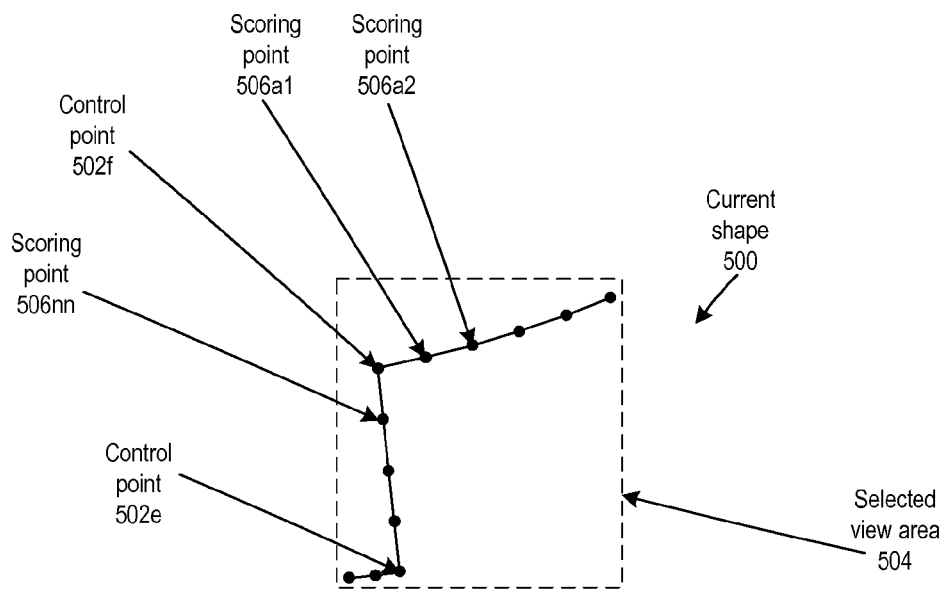

FIG. 5C depicts an enlarged view of a portion of a shape in accordance with one embodiment. Selected view area 504 shows a portion of current shape 500, including control points 502e-502f and various scoring points, of which scoring points 506nn, 506a1 and 506a2 are labeled.

Figure 5D:
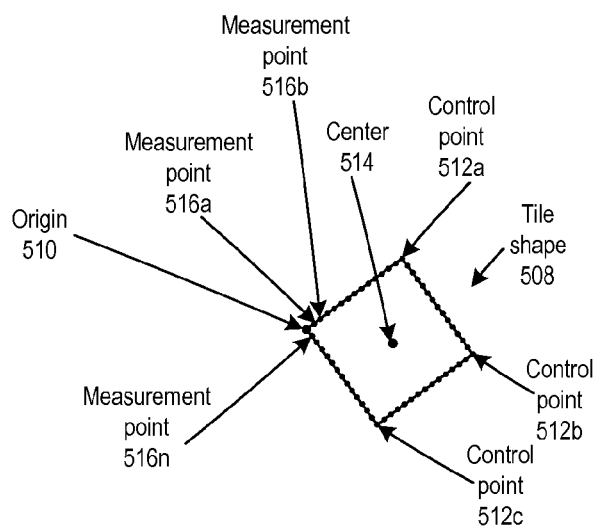

FIG. 5D illustrates a tile in accordance with one embodiment. Tile shape 508 is defined by control points 512a-512c and an origin 510. A center 514 of tile shape 508 is defined with respect to control points 512a-512c. In some embodiments, if control points 512a-512c are insufficient in number or too broadly spaced to allow for scoring of tile locations and orientations, a series of measurement points 516a-516n may be added along the edges of tile shape 508 to provide fixed points for measurement and scoring.

Figure 5E:
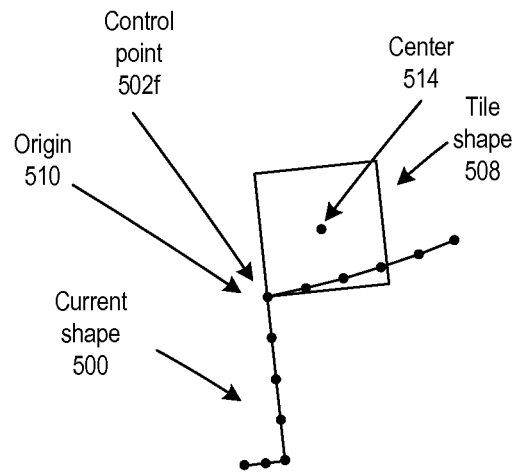
Figure 5F:
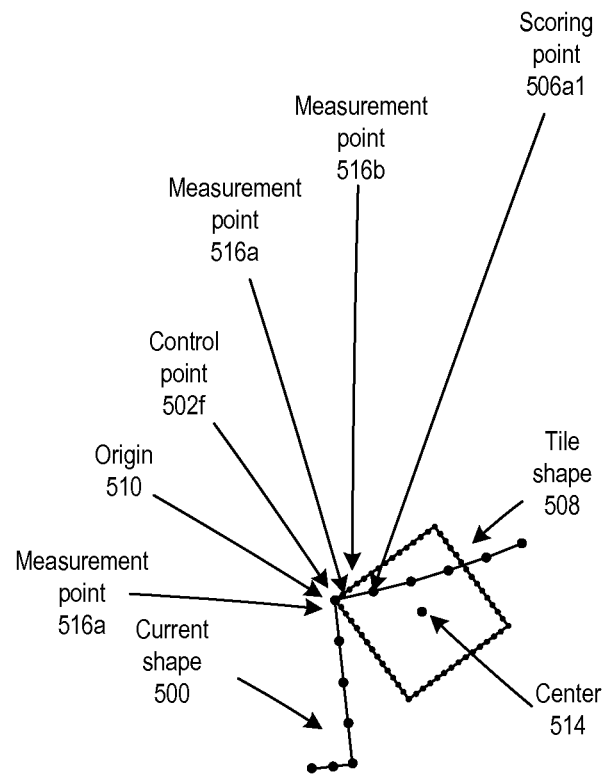

FIGS. 5E-5H illustrate the handling, according to one embodiment, of scoring for various rotations and positions of a tile shape with respect to a current shape. In FIGS. 5E-5F, origin 510 of tile shape 508 is placed at control point 502f of current shape 500. In some embodiments, origin 510 of tile shape 508 will be placed at a particular location on an edge of current shape 500, such as control point 502f and rotated about the control point 502f in fixed or variable increments of an orientation angle.

In one embodiment, such an orientation angle is defined as the angle between a selected line on tile shape 508 and a selected line on current shape 500. In one such embodiment, the line on tile shape 508 is defined as a line between origin 510 and a selected measurement point 516b. Similarly, the selected line on current shape 500 is defined as a line between the measurement or control point 5020f at which origin 510 is placed and a selected scoring point 506a1. At each increment of the orientation angle, such as 5 degree increments, a score may be calculated to ascertain the appropriateness of the tile position (i.e., location and orientation) for use in creating a mosaic image.

FIG. 5E depicts a first example of such a location and orientation pairing according to one embodiment. As discussed above, origin 510 of tile shape 508 is placed at control point 502f of current shape 500. Prior to performing any measurement, an assessment is made as to whether center 514 falls inside or outside of the borders of current shape 500. In the example depicted in FIG. 5E, center 514 falls outside of the borders of current shape 500. Therefore, in one embodiment, the orientation of tile shape 508 depicted in FIG. 5E will be determined to be inappropriate for use as a preferred placement. Alternatively, in some embodiments, other criteria for this preliminary determination of appropriateness may be used. For example, the area of tile shape 508 sitting inside of current shape 500 may be calculated as a percentage of the total area of tile shape 508 and orientations that result in a percentage below a selected threshold may be discarded without scoring.

FIG. 5F depicts a second example of such a location and orientation pairing according to one embodiment. As discussed above, origin 510 of tile shape 508 is placed at control point 502f of current shape 500. Prior to performing any measurement, an assessment is made as to whether center 514 falls inside or outside of the borders of current shape 500. In the example depicted in FIG. 5F, center 514 falls inside of the borders of current shape 500. Therefore, in one embodiment, the orientation of tile shape 508 depicted in FIG. 5F will be determined to be possibly appropriate for use as a preferred placement. Scoring may then be performed.

The methods of scoring a location and orientation pair will vary between embodiments. In one embodiment, the number of measurement points 516a-516n within a threshold distance of the edge of current shape 500 may be determined using scoring points 506a1-506nn. A score can be calculated based on the number of such points that are within the threshold distance from the edge of current shape 500. Alternatively, other scoring criteria may be used. In some embodiments, scoring criteria may be configurable for a particular aesthetic effect desired by a user. In some embodiments, scores are based on an amount of the tile shape that lies within a boundary of the current shape and a distance between an edge of the tile shape and an edge of the current shape.

Figure 5G:
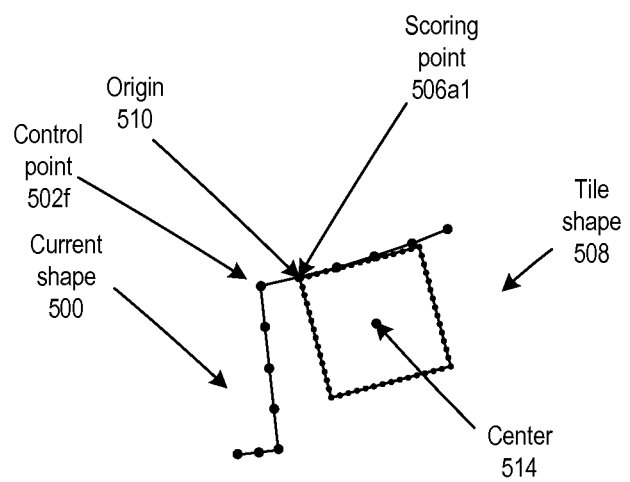

FIG. 5G depicts a third example of such a location and orientation pairing according to one embodiment. Origin 510 of tile shape 508 is placed at scoring point 506a1 of current shape 500. Prior to performing any measurement, an assessment is made as to whether center 514 falls inside or outside of the borders of current shape 500. In the example depicted in FIG. 5G, center 514 falls inside of the borders of current shape 500. Therefore, in one embodiment, the orientation of tile shape 508 depicted in FIG. 5G will be determined to be possibly appropriate for use as a preferred placement. Scoring may then be performed using a method similar to those discussed above with respect to FIG. 5F. In an embodiment, discussed above with respect to FIG. 5F, in which the number of measurement points 516a-516n within a fixed distance of current shape 500 may be determined and a score is calculated based on those points, the position and orientation depicted in FIG. 5G will outscore the position and orientation depicted in FIG. 5F due to proximity between many points of tile shape 508 and the line of current shape 500 proceeding to the right from control point 502f.

Figure 5H:
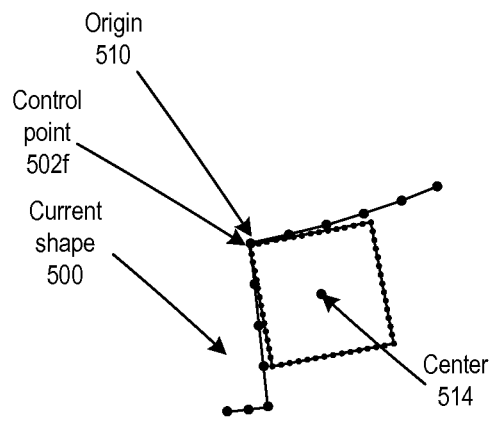

FIG. 5H illustrates a preferred location of a tile shape with respect to a current shape according to one embodiment. In an embodiment, discussed above with respect to FIG. 5F, in which the distance between each of the measurement points 516a-516n and the nearest of scoring points 506a1-506nn may be determined and a score is calculated as an inverse function of the sum of these distances, the position and orientation depicted in FIG. 5H will outscore the positions and orientations depicted in FIGS. 5F-5G due to the degree to which the placement of origin 510 at control point 502f allows for minimization (in the selected orientation) of the distance between tile shape 508 and both the line of current shape 500 descending from control point 502f and the line of current shape 500 extending horizontally from control point 520f. Center 514 is contained within the boundaries of current shape 500.

Example Embodiment of a Scoring Process

Figure 6:
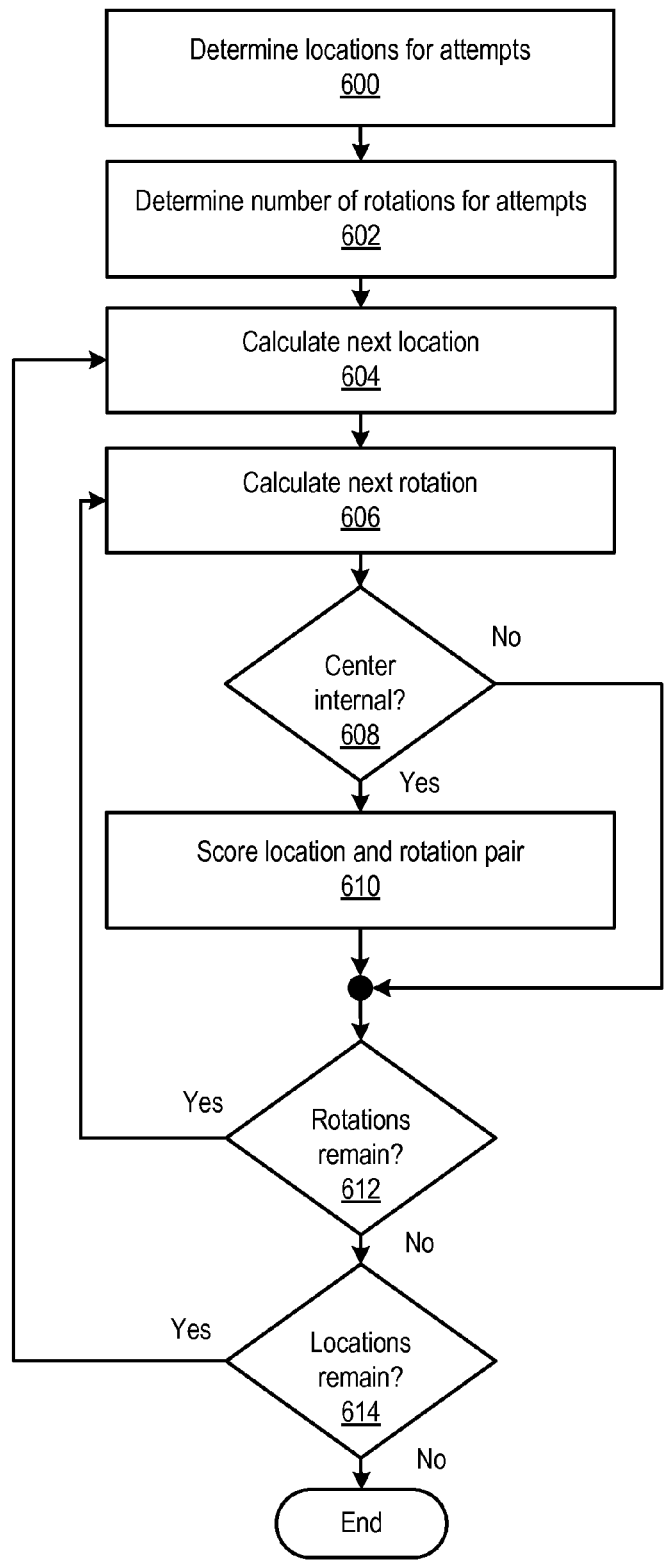
FIG. 6 is a flowchart of operations performed in determining preferred locations and preferred orientations of a set of tiles during a process of iterative tile placement by one embodiment of a system for score-based tile placement.

FIG. 6 is a flowchart of operations performed in determining preferred locations and preferred orientations of a set of tiles during a process of iterative tile placement by one embodiment of a system for score-based tile placement. Locations for attempts at scoring are determined (600). In some embodiments, locations for attempts at scoring may be identified by placing the origin of a tile shape at each of a set of scoring points and control points, such as the scoring points and control points described above with respect to FIGS. 5A-5D.

A number of rotations for attempts at scoring is determined (602). In one embodiment, the number of rotations is fixed at 72, such that each rotation represents 5 degrees of angular variation from the nearest alternative rotation. In some embodiments, the number of locations for attempts at scoring and the number of rotations for attempts at scoring may be configurable. Such configurable control over the number of location attempts and the number of rotations allows, in some embodiments, the pursuit of particular visual effects, such as the use of large angles and particular spacing for irregular edging. Further, such configurable control over the number of location attempts and the number of rotations allow for tradeoffs between the thoroughness of a solution and the processing resources required to generate the solution.

A next location is calculated (604). A next rotation is calculated (606). A determination is made as to whether a center of a tile shape is placed within the boundaries of the current shape using the current orientation (608). If the center of the tile shape is not placed within the boundaries of the current shape using the current orientation, the process proceeds to step 612, which is described below. If the center of the tile shape is placed within the boundaries of the current shape using the current orientation, the location and rotation pair is scored (610).

Tools for scoring are discussed above with respect to FIGS. 5E-5H. A determination is made as to whether any rotations for which scoring has not been attempted remain for the current location (612). If rotations remain for the current location, then the process returns to step 606, which is described above. If no rotations remain for the current location, then a determination is made as to whether any potential locations for which scoring has not been attempted remain for the tile shape (614). If no locations remain for the current tile shape, then the process ends. If locations remain for the current tile shape, then the process returns to step 604, which is described above.

Example Processes for Applying Embodiments of Score-Based Tile Placement

Figure 7:
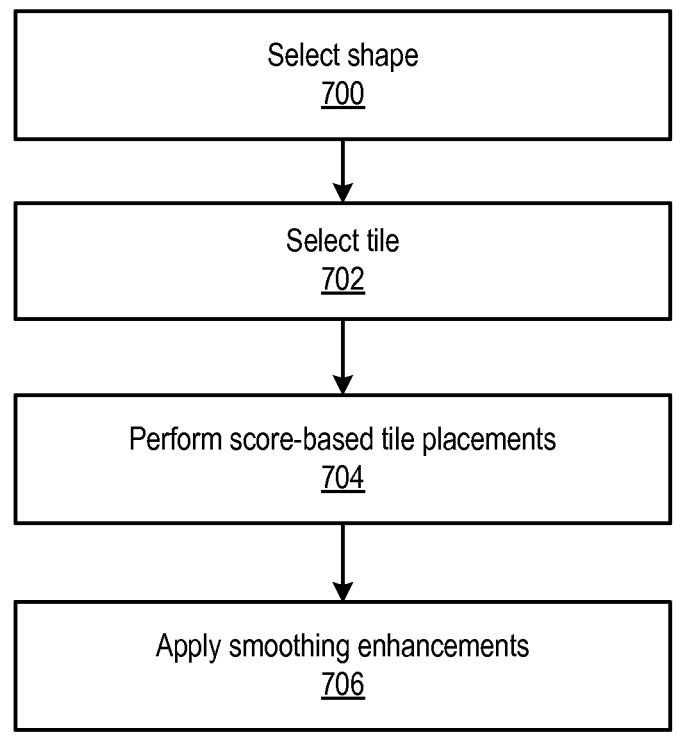
FIG. 7 is a flowchart of operations performed in generating a mosaic image using a process of iterative tile placement by one embodiment of a system for score-based tile placement.

FIG. 7 is a flowchart of operations performed in generating a mosaic image using a process of iterative tile placement by one embodiment of a system for score-based tile placement. A shape is selected (700). A tile shape is selected (702). Score-based tile placements are performed (704). Smoothing enhancements are applied (706). Smoothing enhancements can include any number of algorithms, both known in the prior art and not currently discovered, for performing adjustment to tile locations to improve the aesthetic qualities of a simulated mosaic. Examples include the techniques disclosed by Alejo Hausner in "Simulating Decorative Mosaics" (ACM SIGGRAPH 2001, p573-580) and by Ketan Dalal et. al in "A Spectral Approach to NPR Packing" (NPAR 2006, p71-78), both of which are incorporated herein by reference in their entirety and for all purposes.

Figure 8:
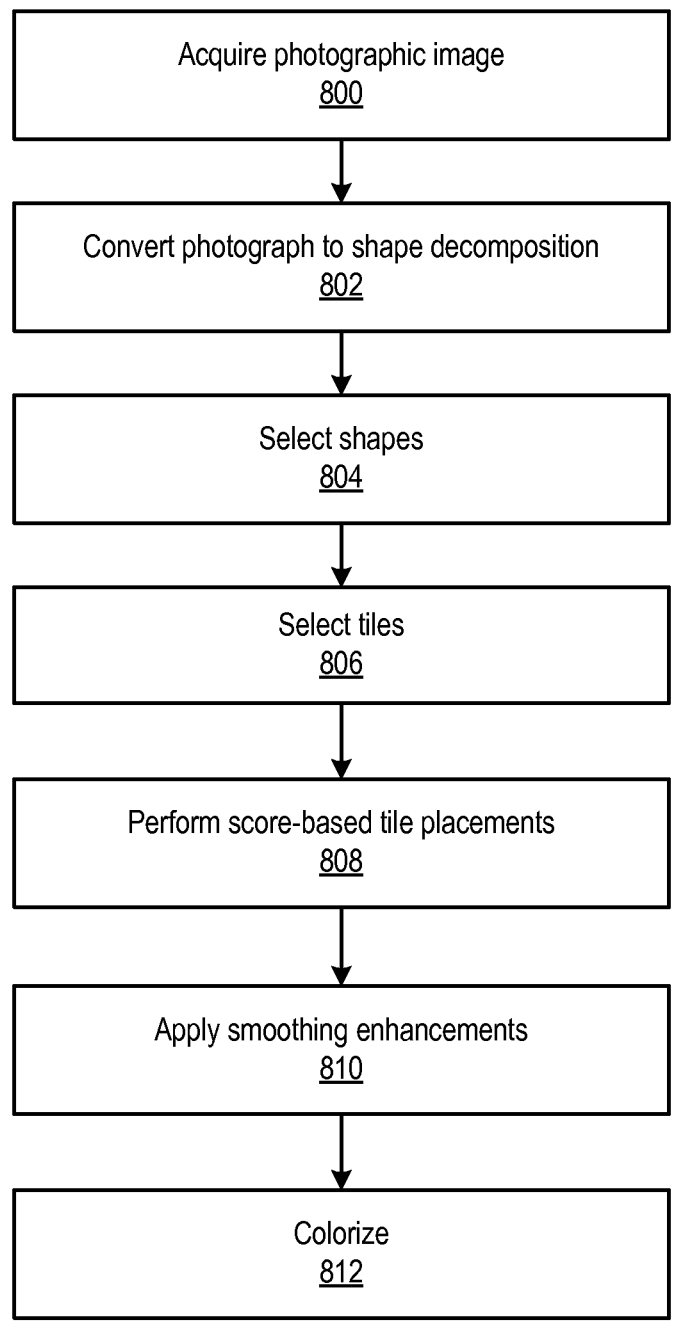
FIG. 8 is a flowchart of operations performed in processing a photographic image to generate a mosaic image using a process of iterative tile placement by one embodiment of a system for score-based tile placement.

FIG. 8 is a flowchart of operations performed in processing a photographic image to generate a mosaic image using a process of iterative tile placement by one embodiment of a system for score-based tile placement. A photographic image is acquired (800). In an embodiment for providing an integrated image processing tool, options for acquiring an image may include the loading of a photographic image from a storage device, the use of photo sensors (such as a scanner or camera) to record an image, or allowing a user to draw an image with drawing tools.

The photographic image is converted to a shape decomposition (802). Conversion to a shape decomposition involves identifying within an image a set of closed line-and-point or vector shapes that present definite edges defined by control points. In images, such as pixel representations of photography, that sometimes lack definite edges, mathematical algorithms can be applied to discover and define definite edges. Shapes are selected for tile fill (804). Tiles are selected for use in filling the selected shapes (806). Score-based tile placements are performed (808), as described above. Smoothing enhancements are applied (810), as described above with respect to FIG. 7. Colorization is performed (810). In some embodiments, colorization can be performed by taking the pixels in the original image that are located within the boundaries of a particular tile and calculating a mean color value or by selecting a closest match from within a fixed palette of available tile colors.

Figure 9:
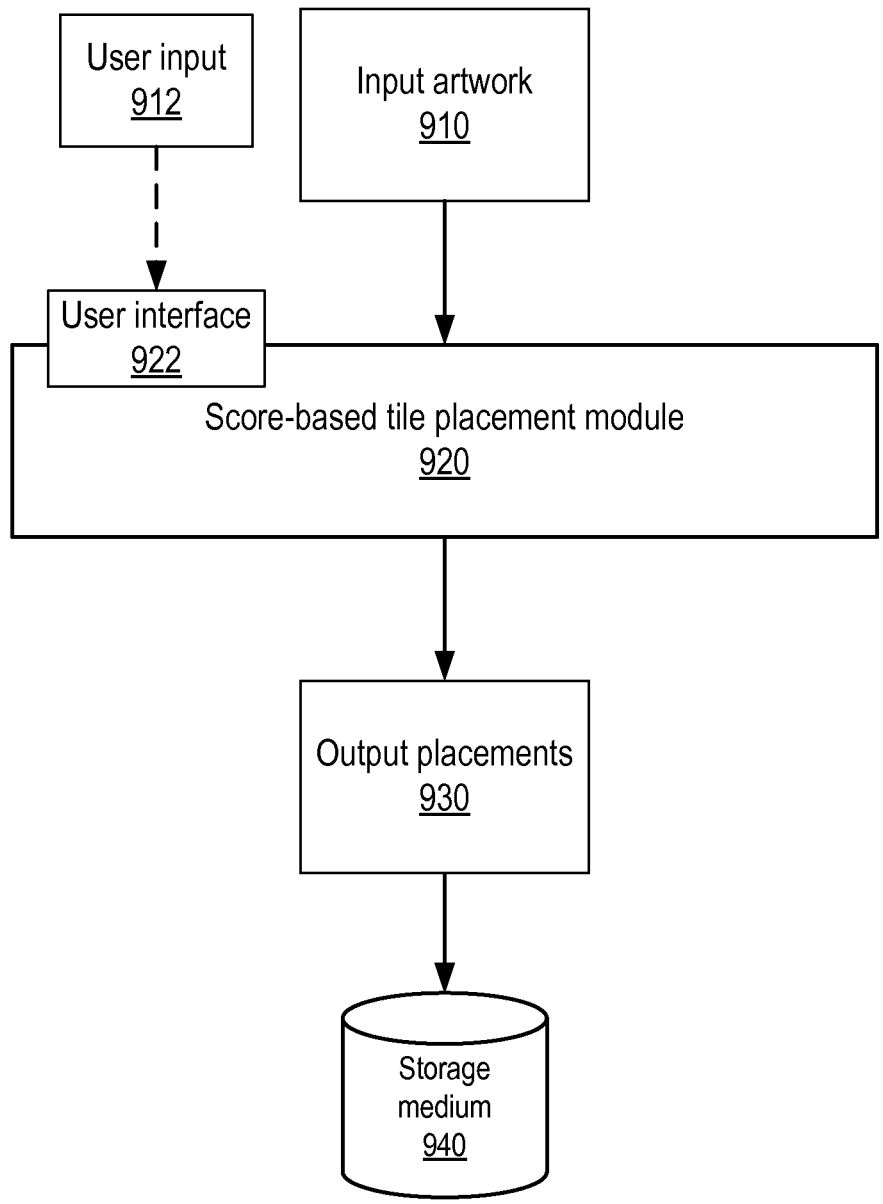
FIG. 9 illustrates a module that may implement a process of iterative tile placement, according to some embodiments.
Figure 10:
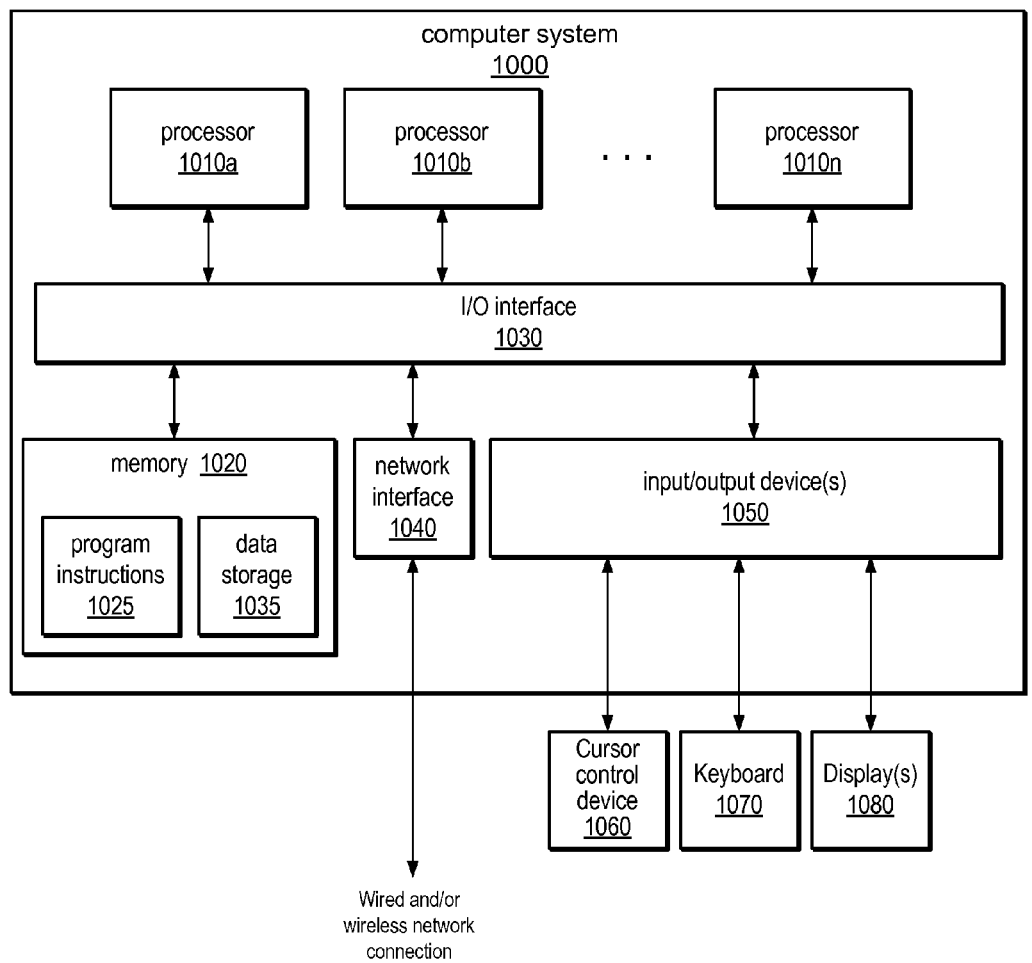
FIG. 10 illustrates an example computer system that may be used in embodiments.

FIG. 9 illustrates a module that may implement a process of iterative tile placement, according to some embodiments. In one embodiment, a score-based tile placement module 920 receives as inputs user input 912 through a user interface 922 and input artwork 910. Initial shape 100 of FIG. 1A is an example of input artwork. FIG. 10 illustrates an example computer system on which score-based tile placement module 920 may be implemented. Score-based tile placement module 920 performs operations described above with respect to FIGS. 1A-8 to generate a data structure comprising output placements 930 for storage on a storage medium 940. Output placements 930 will, in some embodiments, range from a simple list of tile locations associated with a shape to a set of tables defining shapes, individual tile placements within shapes, shape tile definitions, and color information.

As such, score-based tile placement module 920 may perform operations used to fill a larger shape with instances of a smaller shape. Such operations by score-based tile placement module 920 range from the determination of individual tile positions, such as those operations described above with respect to FIG. 2, to the fully featured conversion of photographic images into color tile mosaics, such as those operations described above with respect to FIG. 8.

Score-based tile placement module 920 performs tile placements according to user input 912 received via user interface 922 Output placements 930 may, for example, be stored to a storage medium 940, such as system memory, a disk drive, DVD, CD, etc.

In some embodiments, module 920 may provide a user interface 922 via which a user may interact with the module 920, for example to activate score-based tile placement module 920, to select options for using score-based tile placement module 920, and to perform a tile placement as described herein. In some embodiments, the user interface may provide user interface elements whereby the user may select options including, but not limited to, the tile shapes and sizes, grout thicknesses, orientations of tiles, and optimizations. In some embodiments, the user interface may provide user interface elements whereby the user may specify which layers data is to be sampled from and/or painted to.

Example System

Embodiments of a score-based tile placement module 920 and/or of the various tile placement techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a score-based tile placement module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a score-based tile placement module as described herein, and data storage 1035, comprising various data accessible by program instructions 1025. In one embodiment, program instructions 1025 may include software elements of embodiments of a score-based tile placement module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a score-based tile placement module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    executing a score-based tile placement module on a processor of a computing device to perform:
    determining a preferred location and a preferred orientation of a tile shape with respect to a current shape based on scores at multiple locations and orientations, the scores derived by comparing locations and orientations of the tile shape to scoring points located along a perimeter of the current shape;
    subtracting a tile area from the current shape to generate a new shape, the tile area comprising the tile shape in the preferred orientation of the tile shape at the preferred location of the tile shape with respect to the current shape; and
    setting the new shape to the current shape to perform said determining and said generating.

2. The computer-implemented method of claim 1, further comprising,
    recording to a list of results the preferred location and the preferred orientation with respect to the current shape; and
    recording to the list of results a preferred location and a preferred orientation determined with respect to the new shape.

3. The computer-implemented method of claim 1, wherein determining the preferred location and the preferred orientation with respect to the current shape further comprises:
    processing the current shape by adding a set of the scoring points to the current shape when a measure of a distance between a set of control points on the current shape exceeds a threshold;
    designating a point on the tile shape as an origin of the tile shape;
    scoring the tile shape through a series of rotations about the origin of the tile shape at selected locations; and
    choosing the preferred location and the preferred orientation of the tile shape with respect to the current shape based on results of the scoring.

4. The computer-implemented method of claim 3, wherein choosing the preferred location and the preferred orientation of the tile shape with respect to the current shape based on the results of the scoring further comprises choosing a location and an orientation of the tile shape having a highest score with respect to the current shape.

5. The computer-implemented method of claim 3, wherein choosing the preferred location and the preferred orientation of the tile shape with respect to the current shape based on the results of the scoring further comprises choosing a first location and orientation of the tile shape having a score above a selected threshold with respect to the current shape.

6. The computer-implemented method of claim 3, wherein choosing the preferred location and the preferred orientation of the tile shape with respect to the current shape based on the results of the scoring further comprises assessing whether a center of the tile shape falls outside the current shape in a particular location and orientation prior to scoring the particular location and orientation.

7. The computer-implemented method of claim 3, wherein scoring the tile shape through the series of rotations further comprises computing scores based on an amount of the tile shape that lies within a boundary of the current shape and a distance between an edge of the tile shape and an edge of the current shape.

8. A system, comprising:
a memory configured to store a score-based tile placement module as executable instructions;
one or more processors to execute the score-based tile placement module that is configured to:
determine a preferred location and a preferred orientation of a tile shape with respect to a current shape based on scores at multiple locations and orientations, the scores derived by comparing locations and orientations of the tile shape to scoring points located along a perimeter of the current shape;
subtract a tile area from the current shape to generate a new shape, the tile area comprising the tile shape in the preferred orientation of the tile shape at the preferred location of the tile shape with respect to the current shape; and
set the new shape to the current shape to perform said determining and said generating.

9. The system of claim 8, wherein the score-based tile placement module is further configured to:
record to a list of results the preferred location and the preferred orientation with respect to the current shape; and
record to the list of results a preferred location and a preferred orientation determined with respect to the new shape.

10. The system of claim 8, wherein the score-based tile placement module is further configured to:
process the current shape by adding a set of the scoring points to the current shape when a measure of the distance between a set of control points on the current shape exceeds a threshold;
designate a point on the tile shape as an origin of the tile shape;
score the tile shape through a series of rotations about the origin of the tile shape at selected locations; and
choose the preferred location and the preferred orientation of the tile shape with respect to the current shape based on results of the scoring.

11. The system of claim 10, wherein the preferred location and the preferred orientation of the tile shape are chosen with respect to the current shape based on the results of the scoring by choosing a location and an orientation of the tile shape having a highest score with respect to the current shape.

12. The system of claim 10, wherein the preferred location and the preferred orientation of the tile shape are chosen with respect to the current shape based on the results of the scoring by choosing a first location and orientation of the tile shape having a score above a selected threshold with respect to the current shape.

13. The system of claim 10, wherein the preferred location and the preferred orientation of the tile shape are chosen with respect to the current shape based on the results of the scoring by assessing whether a center of the tile shape falls outside the current shape in a particular location and orientation prior to scoring the particular location and orientation.

14. The system of claim 8, wherein the score-based tile placement module is further configured to decompose an image to generate the current shape.

15. A computer-readable storage device having program instructions stored thereon that are executable by a computing system to perform operations comprising:
determining a preferred location and a preferred orientation of a tile shape with respect to a current shape based on scores at multiple locations and orientations, the scores derived by comparing locations and orientations of the tile shape to scoring points located along a perimeter of the current shape;
subtracting a tile area from the current shape to generate a new shape, the tile area comprising the tile shape in the preferred orientation of the tile shape at the preferred location of the tile shape with respect to the current shape; and
setting the new shape to the current shape to perform said determining and said generating.

16. The computer-readable storage device of claim 15, wherein the operations further comprise:
recording to a list of results the preferred location and the preferred orientation with respect to the current shape; and
recording to the list of results a preferred location and a preferred orientation determined with respect to the new shape.

17. The computer-readable storage device of claim 15, wherein the operations further comprise:
processing the current shape by adding a set of the scoring points to the current shape when a measure of the distance between a set of control points on the current shape exceeds a threshold;
designating a point on the tile shape as an origin of the tile shape;
scoring the tile shape through a series of rotations about the origin of the tile shape at selected locations; and
choosing the preferred location and the preferred orientation of the tile shape with respect to the current shape based on results of the scoring.

18. The computer-readable storage device of claim 17, wherein choosing the preferred location and the preferred orientation of the tile shape with respect to the current shape based on the results of the scoring further comprises choosing a location and an orientation of the tile shape having a highest score with respect to the current shape.

19. The computer-readable storage device of claim 17, wherein choosing the preferred location and the preferred orientation of the tile shape with respect to the current shape based on the results of the scoring further comprises choosing a first location and orientation of the tile shape having a score above a selected threshold with respect to the current shape.

20. The computer-readable storage device of claim 17, wherein choosing the preferred location and the preferred orientation of the tile shape with respect to the current shape based on the results of the scoring further comprises assessing whether a center of the tile shape falls outside the current shape in a particular location and orientation prior to scoring the particular location and orientation.

\* \* \* \* \*